(12) United States Patent
Rao

(10) Patent No.: US 7,584,466 B1
(45) Date of Patent: Sep. 1, 2009

(54) MANAGEMENT TREE MANAGEMENT IN A MOBILE HANDSET

(75) Inventor: Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 801 days.

(21) Appl. No.: 10/868,050

(22) Filed: Jun. 15, 2004

Related U.S. Application Data

(60) Provisional application No. 60/478,871, filed on Jun. 16, 2003, provisional application No. 60/479,268, filed on Jun. 18, 2003.

(51) Int. Cl.
*G06F 9/44* (2006.01)
*G06F 9/45* (2006.01)
*H04M 3/00* (2006.01)

(52) U.S. Cl. .................................. 717/168; 717/140
(58) Field of Classification Search .................. 717/121, 717/168, 177
See application file for complete search history.

(56) References Cited

U.S. PATENT DOCUMENTS

| | | | |
|---|---|---|---|
| 5,261,055 A | 11/1993 | Moran et al. ................ 395/275 |
| 5,442,771 A | 8/1995 | Filepp et al. ................ 395/650 |
| 5,479,637 A | 12/1995 | Lisimaque et al. .......... 395/430 |
| 5,579,522 A * | 11/1996 | Christeson et al. ............. 713/2 |
| 5,596,738 A | 1/1997 | Pope .......................... 395/430 |
| 5,598,534 A | 1/1997 | Haas ...................... 395/200.09 |
| 5,608,910 A | 3/1997 | Shimakura .................. 395/670 |
| 5,623,604 A | 4/1997 | Russell et al. ............ 395/200.1 |
| 5,666,293 A | 9/1997 | Metz et al. ................ 395/200.5 |
| 5,752,039 A | 5/1998 | Tanimura ..................... 395/712 |
| 5,778,440 A | 7/1998 | Yiu et al. ..................... 711/154 |
| 5,790,974 A | 8/1998 | Tognazzini ................. 701/204 |
| 5,878,256 A | 3/1999 | Bealkowski et al. ......... 395/652 |
| 5,960,445 A | 9/1999 | Tamori et al. ............... 707/203 |
| 6,009,497 A | 12/1999 | Wells et al. ................. 711/103 |
| 6,038,636 A | 3/2000 | Brown, III et al. .......... 711/103 |
| 6,064,814 A | 5/2000 | Capriles et al. ............. 395/701 |
| 6,073,206 A | 6/2000 | Piwonka et al. ............. 711/102 |
| 6,073,214 A | 6/2000 | Fawcett ...................... 711/133 |
| 6,088,759 A | 7/2000 | Hasbun et al. .............. 711/103 |
| 6,105,063 A | 8/2000 | Hayes, Jr. ................... 709/223 |
| 6,112,024 A | 8/2000 | Almond et al. ............. 395/703 |
| 6,112,197 A | 8/2000 | Chatterjee et al. .............. 707/3 |
| 6,126,327 A | 10/2000 | Bi et al. ................. 395/200.51 |
| 6,128,695 A | 10/2000 | Estakhri et al. ............. 711/103 |

(Continued)

FOREIGN PATENT DOCUMENTS

CA          2339923          3/2000

(Continued)

OTHER PUBLICATIONS

"SyncML Device Management Tree and Description, Version 1.1.2", Dec. 2, 2003, @Open Mobile Alliance ltd., 1-44.*

*Primary Examiner*—Tuan Q Dam
*Assistant Examiner*—Marina Lee

(57) ABSTRACT

A mobile handset network employs a device management server to manage managed objects that are located in a management tree. Access to the managed objects in the management tree is provided to applications and components that execute in the same environment or in different environments. Special managed objects are employed that are accessible by the DM client as well as by the update agents in the mobile handset.

19 Claims, 6 Drawing Sheets

U.S. PATENT DOCUMENTS

| | | | | |
|---|---|---|---|---|
| 6,157,559 | A | 12/2000 | Yoo | 365/52 |
| 6,163,274 | A | 12/2000 | Lindgren | 340/825.44 |
| 6,198,946 | B1 | 3/2001 | Shin et al. | 455/561 |
| 6,279,153 | B1 | 8/2001 | Bi et al. | 717/11 |
| 6,311,322 | B1 | 10/2001 | Ikeda et al. | 717/1 |
| 6,438,585 | B2 | 8/2002 | Mousseau et al. | 709/206 |
| 6,659,345 | B2 * | 12/2003 | Sukeda et al. | 235/382 |
| 7,055,148 | B2 * | 5/2006 | Marsh et al. | 717/172 |
| 7,242,929 | B2 * | 7/2007 | Draluk et al. | 455/419 |
| 7,275,243 | B2 * | 9/2007 | Gibbons et al. | 717/159 |
| 7,292,846 | B2 * | 11/2007 | Mittal | 455/418 |
| 7,433,936 | B2 * | 10/2008 | Zhu et al. | 709/220 |
| 2001/0029178 | A1 | 10/2001 | Criss et al. | 455/419 |
| 2001/0047363 | A1 | 11/2001 | Peng | 707/104.1 |
| 2001/0048728 | A1 | 12/2001 | Peng | 375/354 |
| 2002/0078209 | A1 | 6/2002 | Peng | 709/227 |
| 2002/0116261 | A1 | 8/2002 | Moskowitz et al. | 705/14 |
| 2002/0131404 | A1 | 9/2002 | Mehta et al. | 370/352 |
| 2002/0152005 | A1 | 10/2002 | Bagnordi | 700/234 |
| 2002/0156863 | A1 | 10/2002 | Peng | 709/217 |
| 2002/0157090 | A1 | 10/2002 | Anton, Jr. | 717/178 |
| 2003/0033599 | A1 | 2/2003 | Rajaram et al. | 717/173 |
| 2003/0037075 | A1 | 2/2003 | Hannigan et al. | 707/500 |
| 2003/0061384 | A1 | 3/2003 | Nakatani | 709/245 |
| 2003/0081786 | A1 * | 5/2003 | Nakano et al. | 380/277 |
| 2003/0103484 | A1 * | 6/2003 | Oommen et al. | 370/338 |
| 2003/0204640 | A1 * | 10/2003 | Sahinoja et al. | 709/311 |
| 2004/0034853 | A1 * | 2/2004 | Gibbons et al. | 717/174 |
| 2004/0068724 | A1 * | 4/2004 | Gardner et al. | 717/173 |
| 2004/0098715 | A1 * | 5/2004 | Aghera et al. | 717/173 |
| 2005/0204068 | A1 * | 9/2005 | Zhu et al. | 709/252 |
| 2005/0227683 | A1 * | 10/2005 | Draluk et al. | 455/419 |
| 2006/0039561 | A1 * | 2/2006 | Ypya et al. | 380/270 |
| 2006/0258344 | A1 * | 11/2006 | Chen | 455/419 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

* cited by examiner

MANAGEMENT TREE MANAGEMENT IN A MOBILE HANDSET

CROSS-REFERENCE TO RELATED APPLICATIONS

This patent application makes reference to, claims priority to, and claims benefit from U.S. Provisional Patent Applications Ser. No. 60/478,871, entitled "Management Tree Management in Mobile Handset," filed on Jun. 16, 2003, and Ser. No. 60/479,268, entitled, "Management Tree Management in Mobile Handset", filed Jun. 18, 2003.

The complete subject matter of the above-referenced U.S. Provisional Patent Applications are hereby incorporated herein by reference, in their entirety. In addition, this application makes reference to U.S. Provisional Patent Application Ser. No. 60/249,606, entitled "System and Method for Updating and Distributing Information", filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety.

FEDERALLY SPONSORED RESEARCH OR DEVELOPMENT

Not Applicable

MICROFICHE/COPYRIGHT REFERENCE

Not Applicable

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. The management of managed objects in mobile handsets is neither supported by APIs nor properly supported by management clients. For example, a Java management client may create a management tree in a Java virtual machine (JVM) environment that is neither accessible from a C program in a non-JVM environment nor visible. Similarly, a management tree maintained in a non-JVM environment is not accessible from a mobile information device profile (MIDP) JVM. In addition, a management tree saved in a JVM record store is not accessible to a C program executing in an environment that is external to the JVM.

Creating managed objects is important for device management. Inserting managed objects into a management tree from several different environments and sharing the management tree across all these environments is, although essential, currently not supported in most mobile handsets due to various reasons. Access to the managed objects in the management tree is also very important but is not possible in most handsets.

Managed objects are sometimes used to represent software and hardware components in a mobile handset. Managed objects may be arranged in a tree type data structure. It is a problem when data stored in the nodes and leaves of such a tree are not accessible to applications or components due to various reasons. For example, if the software that manages the tree is not accessible to the consumers of the tree, it is a problem. If a standard application program interface (API) does not exist for the management of the management tree, it is a problem. If the various components of the management can only be read but not locally updated by components in the device, it is of limited use and a problem.

Further limitations and disadvantages of conventional and traditional approaches will become apparent to one of ordinary skill in the. art through comparison of such systems with the present invention.

BRIEF SUMMARY OF THE INVENTION

Aspects of the present invention may be seen in a mobile device managed by a device management server. In a representative embodiment of the present invention, the mobile device may comprise a device management tree capable of being manipulated by the device management server, where at least one of a firmware component and a software component may be resident in the mobile device. The device management tree may be locally accessible by at least a subset of the at least one of a firmware component and a software component resident in the mobile device. In a representative embodiment of the present invention, the device management tree may comprise a plurality of nodes and leaves, and the at least a subset of the at least one of a firmware component and a software component resident in the mobile device may be capable of setting values into at least one of the plurality of nodes and leaves. The at least a subset of the at least one of a firmware component and a software component resident in the mobile device may be capable of setting a status value into at least one of the plurality of nodes and leaves. In addition, the at least a subset of the at least one of a firmware component and a software component resident in the mobile device may be capable of reading values from the at least one of the plurality of nodes and leaves.

In a representative embodiment in accordance with the present invention, the at least one of the plurality of nodes and leaves may comprise a special node that is located at a predetermined location in memory that is known and accessible by at least a subset of the at least one of a firmware component and a software component resident in the mobile device. The predetermined location in memory may be provisioned into the mobile device, and the at least one of a firmware component and a software component resident in the mobile device may employ the special node at the predetermined location in memory in order to access the at least one of the plurality of nodes and leaves. The at least one of a firmware component and a software component resident in the mobile device may employ the special node at the predetermined location in memory to set status values in the at least one of the plurality of nodes and leaves. The special node located in the predetermined location in memory may be accessible only to a qualified subset of the at least one of a firmware component and a software component resident in the mobile.

A representative embodiment of the present invention may further comprise a plurality of special nodes located in a plurality of associated predetermined locations, where each of the plurality of associated predetermined locations may be known to those of the at least one of a firmware component and a software component resident in the mobile device that have a need to access the information stored in the plurality of special nodes. The plurality of special nodes may be located together in a structure at a special location.

Further aspects of the present invention may be found in a mobile device that facilitates the creation and manipulation of managed objects in a management tree based upon information received via a communication network. In a representative embodiment of the present invention, the management tree may have a root serving as a gateway or navigation point to a plurality of managed objects in the management tree.

Such an embodiment may comprise non-volatile memory, update agent code for converting at least a portion of the non-volatile memory from a first version of code to a second version of code, and at least a subset of the managed objects may be special managed objects each of whose physical location in the non-volatile memory is assigned to a predetermined memory address. A representative embodiment of the present invention may also comprise at least one firmware component, and the special managed objects may be located at the pre-determined addresses in the non-volatile memory of the mobile device such that the at least one firmware component is capable of accessing the special managed objects from the predetermined addresses. The firmware component may comprise code executed during at least one of reboot and startup of the mobile device, and the special managed objects may have the same behavioral semantics as others of the plurality of managed objects that are not special. The special managed objects may be mapped to a physical non-volatile memory address that is an associated fixed and well-known address, and the at least one firmware component may comprise at least one sub-component that is accessible using the associated fixed and well-known address of at least one of the special managed objects.

In various representative embodiments of the present invention, the special managed objects may be capable of providing configuration data to associated ones of the at least one firmware component, where the configuration data may comprise at least one of an address, status information, and security information. The configuration data may comprise a 4-byte address where an update package is saved in the non-volatile memory, a 4-byte status information capable of indicating the availability of the update package, a 4-byte verification data, and a 4-byte address of a backup memory area for use in fault tolerant updates. The at least one firmware component may comprise update agent code for updating the non-volatile memory, and the update agent code may be capable of accessing special managed objects comprising configuration data, when executed during at least one of startup and reboot of the mobile device. In addition, the update agent code may be capable of accessing special managed objects at the associated fixed and well-known address.

A representative embodiment in accordance with the present invention may also comprise update agent code capable of converting at least a portion of the non-volatile memory from a first version of code to a second version of code, and a special managed object reference table used to save references to addresses of special managed objects in the management tree. The special managed object reference table may be accessible to the update agent code, and the update agent code may be capable of accessing information stored in special managed objects employing references in the special managed object reference table. An address of the special managed object reference table may be a well-known address known to the update agent code, and an address of the special managed object reference table may be known to the update agent code by a default value that is hard-coded or predefined for the update agent code.

These and other features and advantages of the present invention may be appreciated from a review of the following detailed description of the present invention, along with the accompanying figures in which like reference numerals refer to like parts throughout.

DETAILED DESCRIPTION OF THE INVENTION

The present invention relates generally to generating updates of firmware/software components in electronic devices such as, for example, mobile handsets using an update agent, and more specifically to the use of instruction sets in the generation of update packages that the update agents may process to produce updates for the firmware/software components. Although the following discusses aspects of the invention in terms of a mobile handset, it should be clear that the following also applies to other mobile electronic devices such as, for example, personal digital assistants (PDAs), pagers, personal computers (PCs), and similar handheld electronic devices.

Figure 1:
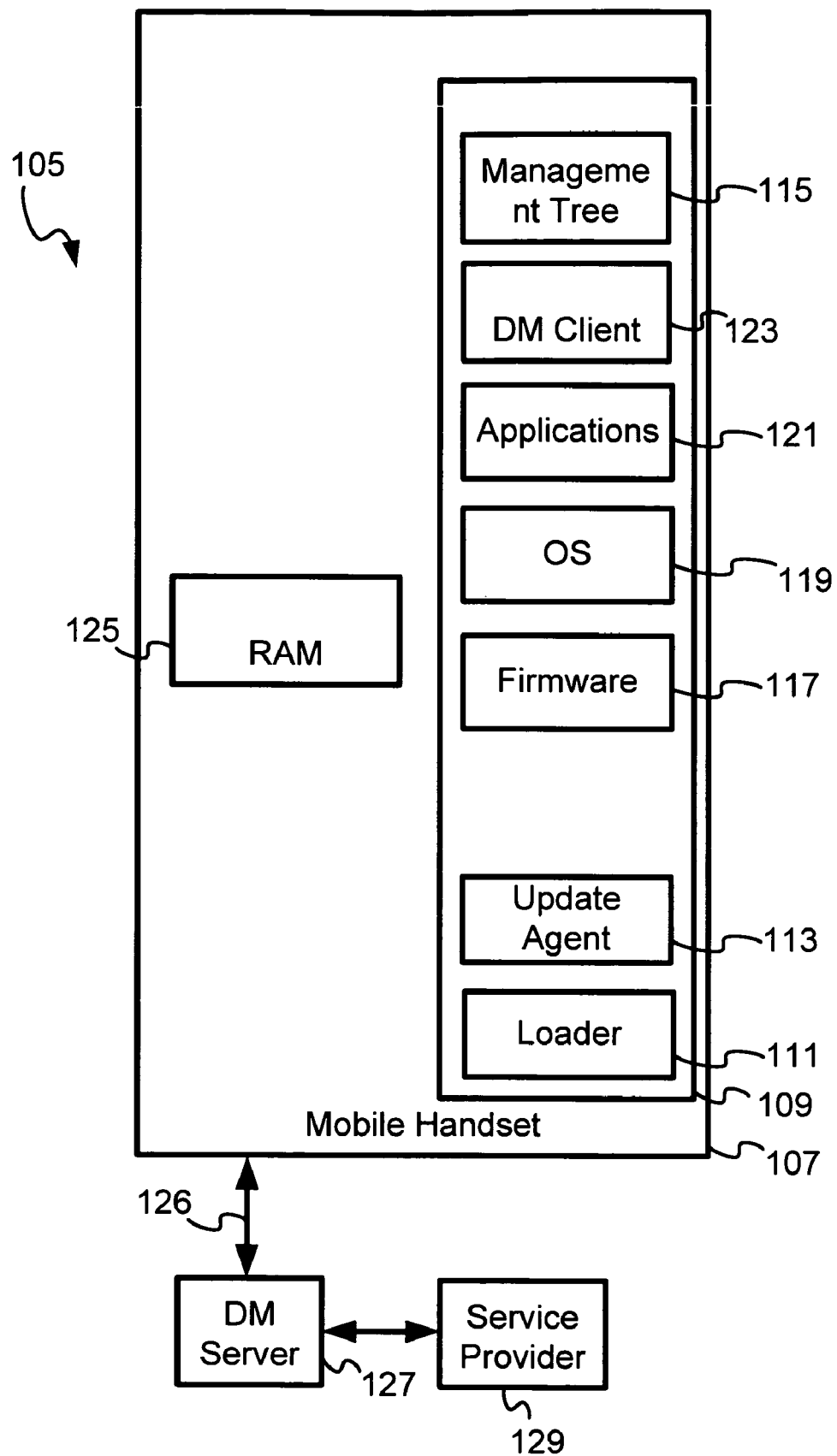
FIG. 1 illustrates a block diagram of an exemplary mobile handset network, in accordance with a representative embodiment of the present invention.

FIG. 1 illustrates a block diagram of an exemplary mobile handset network 105, in accordance with a representative embodiment of the present invention. The mobile handset network 105 facilitates the creation and manipulation of a management tree of managed objects in a mobile handset 107. As illustrated in FIG. 1, the mobile handset network 105 comprises a device management (DM) server 127 that is communicatively coupled to a service provider 129 and to the mobile handset 107. The mobile handset 107 comprises a RAM 125, and a non-volatile memory 109 that comprises a management tree 115, a device management client 123, applications 121, an operating system (OS) 119, a firmware 117, an update agent 113 and a loader 111.

In a representative embodiment of the present invention, the DM server 127 may facilitate the creation and management of managed objects in the mobile handset 107, where the managed objects may be arranged in the mobile handset 107 in a data structure called a management tree 115. Access to the managed objects in the management tree 115 may be facilitated by the device management (DM) client 123 in the mobile handset 107. In a representative embodiment in accordance with the present invention, the applications 121, the operating system 119, and the firmware 117 may access managed objects by interacting with the DM client 123.

In a representative embodiment of the present invention, the managed objects in the management tree 115 may represent components, hardware or software, including provisioning parameters and configuration parameters, that may be set remotely from the DM server 127, or that may be created and manipulated remotely from the DM server 127, via a communication link 126. The communication link 126 may be a wired link such as, for example, a public switched telephone network or packet network, or a wireless link such as, for example, a cellular or paging network, or the like. In a related representative embodiment of the present invention, the DM server 127 and the mobile handset 107 may employ Sync ML DM protocols to manage the management tree and the other components in the mobile handset 107. In another related representative embodiment of the present invention, the DM client 123 and the DM server 127 may communicate using appropriate transport protocols and the Sync ML DM protocol to facilitate device management of the mobile handset 107.

The management tree may be arranged such that some of the managed objects in the management tree may be treated as "special managed objects". For example, in one representative embodiment of the present invention, these special managed objects may be located at pre-determined locations in non-volatile memory of the mobile device, such that firmware components and code executed during reboot or startup can access the managed objects from these predetermined locations when the DM client 123 is not available or inaccessible. In a related representative embodiment in accordance with the present invention, the special managed objects may be located at "well-known" locations in non-volatile memory of the mobile device such that specific applications or components, such as the update agent 113, may access information stored in these "special managed objects".

In a representative embodiment of the present invention, the update agent 113 may access a special managed object dedicated to providing configuration data to the update agent 113. For example, such configuration data may comprise 16 bytes of information, including a 4-byte address location where an appropriate update package is saved in non-volatile memory, a 4-byte status information indicating the need to update firmware or software, a 4-byte verification data such as CRC, and an optional 4-byte address of a backup section that may be used for fault tolerant updates. The update agent 113 may access the special managed object that comprises the configuration data when it executes during startup or during reboot. The access to the special managed object may be possible due to its location at a "well-known" location within the scope of the update agent 113.

In a representative embodiment of the present invention, the network 105 may dispense to the mobile handset 107, update packages generated by a generator. The mobile handset 107 may employ the dispensed update packages to update firmware and/or software. In a representative embodiment of the present invention, an update package may comprise executable instructions used to convert firmware/software in the mobile handset 107 from one version of code to another. In an embodiment of the present invention, the executable instructions may comprise difference information between the new version and the old version of the firmware and/or software.

In a representative embodiment of the present invention, the service provider 129 may be associated with a unique service subscribed to by the user of mobile handset 107. and the service provider 129 may be associated with specific management parameters, configuration information, subscriber information and/or an application 121 in the mobile handset 107, with one or more appropriate managed objects employed to represent such information, and each of these may be uniquely addressable as managed objects that are part of the management tree 115.

In a representative embodiment of the present invention, the managed objects may be specified and manipulated as MIB objects by the DM server 127 and the DM client 123. In such a representative embodiment, the managed objects may be accessed via a virtual information store, termed the Management Information Base or MIB. Objects in the MIB may be defined using the subset of Abstract Syntax Notation One (ASN.1) defined in the SMI. In particular, each object type may be named by an OBJECT IDENTIFIER that may be an administratively assigned name. The object type, together with an object instance, serves to uniquely identify a specific instantiation of the object. In a related representative embodiment of the present invention, the DM server 127 and the DM client 123 may, for example, employ SNMP protocols to manage the managed objects in the management tree 115. In another representative embodiment of the present invention, interactions between the DM server 127 and the DM client 123 may, for example, be conducted employing http protocols.

In a representative embodiment in accordance with the present invention, the DM client 123 may support multiple simultaneous reads of elements of the management tree 115, and synchronized or controlled single writes. In a related representative embodiment of the present invention, this multiple-read, one-write mechanism may be selectively extended to multiple writes, if distinct, non-overlapping subsets of the tree are being accessed or manipulated simultaneously (for read or writes). Thus read-while-write may also be supported.

In a representative embodiment of the present invention, the service provider 129 may provide mechanisms by which the appropriate components such as, for example, applications 121 or OS components 119, are managed using management facilities and interfaces provided by the DM server 127. Interactions between the DM server 127 and the service provider 129 may, for example, occur over SOAP (simple object access protocol) or http protocols.

In a representative embodiment of the present invention, the mobile handset 107 may facilitate manipulation of the management tree 115 from different environments, at the same time. In a representative embodiment of the present invention, the mobile handset 107 may facilitate simultaneous access from multiple environments such as, for example, from a Java environment and a C program environment.

In one embodiment, the update agent 113 accesses the management tree (or portions thereof) employing an address of the management tree that is either a known address or passed to it as a parameter. After accessing the management tree 115, information regarding the update package, starting address of firmware, CRC information, security information, etc. are retrieved from the management tree 115 by the update agent 113. In a different embodiment, the update agent 113 runs as part of the initial firmware processing, during reset or reboot of the mobile handset 107, and accesses the management tree 115 to retrieve update package related information and firmware and software update related information from the management tree 115.

In a representative embodiment of the present invention, the management tree 115 may have a managed object representing firmware 117 in the mobile handset 107 that an update agent 113 has access to. The update agent 113 may be capable of retrieving information from the firmware managed object such as, for example, the location of firmware 117 in non-volatile memory 109, its initialization flags, configuration parameters, if any, etc. In a related embodiment, an update package may be stored as a managed object in the management tree 115 that the update agent 113 has access to, and may be capable of retrieving, at run-time.

In a representative embodiment of the present invention, specific managed objects in the management tree 115 may be created in well known (or pre-determined) locations of non-volatile memory 109, so that they may be accessible to firmware components or low-level code, such as the update agent 113. This may be important since some managed objects stored in the management tree 115 may be accessed by such low level code, such as during reboot or reset, when the DM client 123 or other software, that are typically used to manage and manipulate the management tree 115, are absent or inaccessible.

In a representative embodiment of the present invention, the management tree may be a logical concept with no real tree data structure, and its implementation may employ a table (or alternative data structures) with references to actual components or data being provided, that are construed to be elements such as nodes and leaves in the management tree.

In a representative embodiment in accordance with the present invention, the management tree may be part of the management client implementation.

Figure 2:
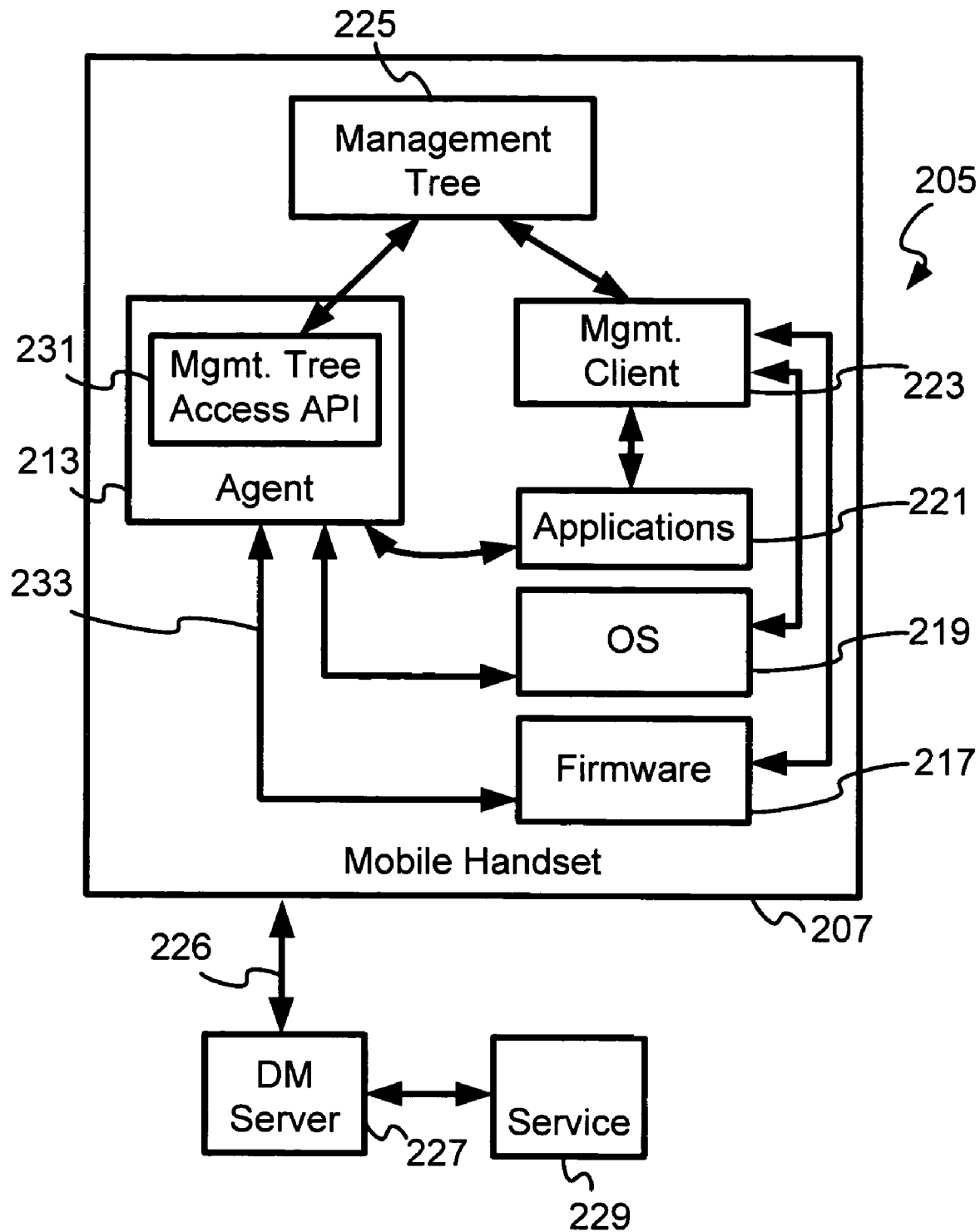
FIG. 2 is a perspective block diagram of an exemplary mobile handset network that facilitates the creation and manipulation of a management tree of managed objects in a mobile handset, in accordance with a representative embodiment of the present invention.

FIG. 2 is a perspective block diagram of an exemplary mobile handset network 205 that facilitates the creation and manipulation of a management tree 225 of managed objects in a mobile handset 207, in accordance with a representative embodiment of the present invention. As shown in the illustration of FIG. 2, the mobile handset network 205 may comprise a device management (DM) server 227 that is communicatively coupled to a service provider 229 and to the mobile handset 207 via a communication link 226. The communication link 226 may be a wired or wireless link, and may correspond, for example, to the communication link 126 of FIG. 1. The mobile handset 107 may comprise a firmware 217, an operating system (OS) 219, applications 221 (one or more), a management client 223, an agent 213, and the management tree 225.

In various representative embodiments of the present invention, there are two mechanisms by which the management tree may be accessed by applications, OS components, firmware components etc. in the mobile handset 207. The first mechanism may invoke appropriate commands with the associated parameters provided by the management client 223, which exposes the management tree 225 and provides synchronization (read write synchronization), if necessary. A second mechanism may be via the management tree access API 231, that may be used during a compilation of the associated application or component. The management tree access API 231 may provide functions or classes and methods that expose the capabilities of the management tree 225, while also providing a programming interface to it that could be used during compilation of code.

In a representative embodiment of the present invention, the management tree 225 may be saved by the mobile handset 207 in non-volatile memory such as, for example, FLASH memory. The agent 213 may be capable of accessing the management tree 225, or specific subtrees of the management tree 225. In a representative embodiment of the present invention, the agent 213 may employ the management tree access API 231, with which it is compiled during a compilation phase, such as during code development or installation. In a representative embodiment of the present invention, managed object information may be retrieved by the agent 213 from the management tree 225, by employing information regarding the location of the management tree, and optionally, the location of specific subtrees, along with identifiers for managed objects.

In of a representative embodiment of the present invention, the agent 213 may be compiled with a management tree API implementation 231 to generate an executable capable of manipulating the management tree 225. In such an embodiment, the management tree 225, or subsets thereof, may be accessed via the management tree API implementation 231. Changes made to the management tree 225 may be made persistent via appropriate functions provided by the management tree API implementation 231.

In another representative embodiment of the present invention, the agent 213 may be part of the firmware 217, and may be invoked before the operating system 219 is invoked. The agent 213, employing the management tree access API and management tree related information, such as address location, size, security information, etc., may access specific managed objects from a persistent managed tree currently located in non-volatile memory (such as FLASH).

The management client 223 may be employed by the operating system 219 components, applications 221, etc., to gain access to managed objects in the management tree 225 and to retrieve and/or manipulate managed objects.

In a representative embodiment of the present invention, lifecycle management of the management tree 225 may be facilitated by the management tree access API implementation 231. In another representative embodiment in accordance with the present invention, it may be facilitated by a management client 223. In a related representative embodiment of the present invention, life cycle management of the management tree 225 may be supported by both the management tree API implementation 231 and the management client 223.

Figure 3:
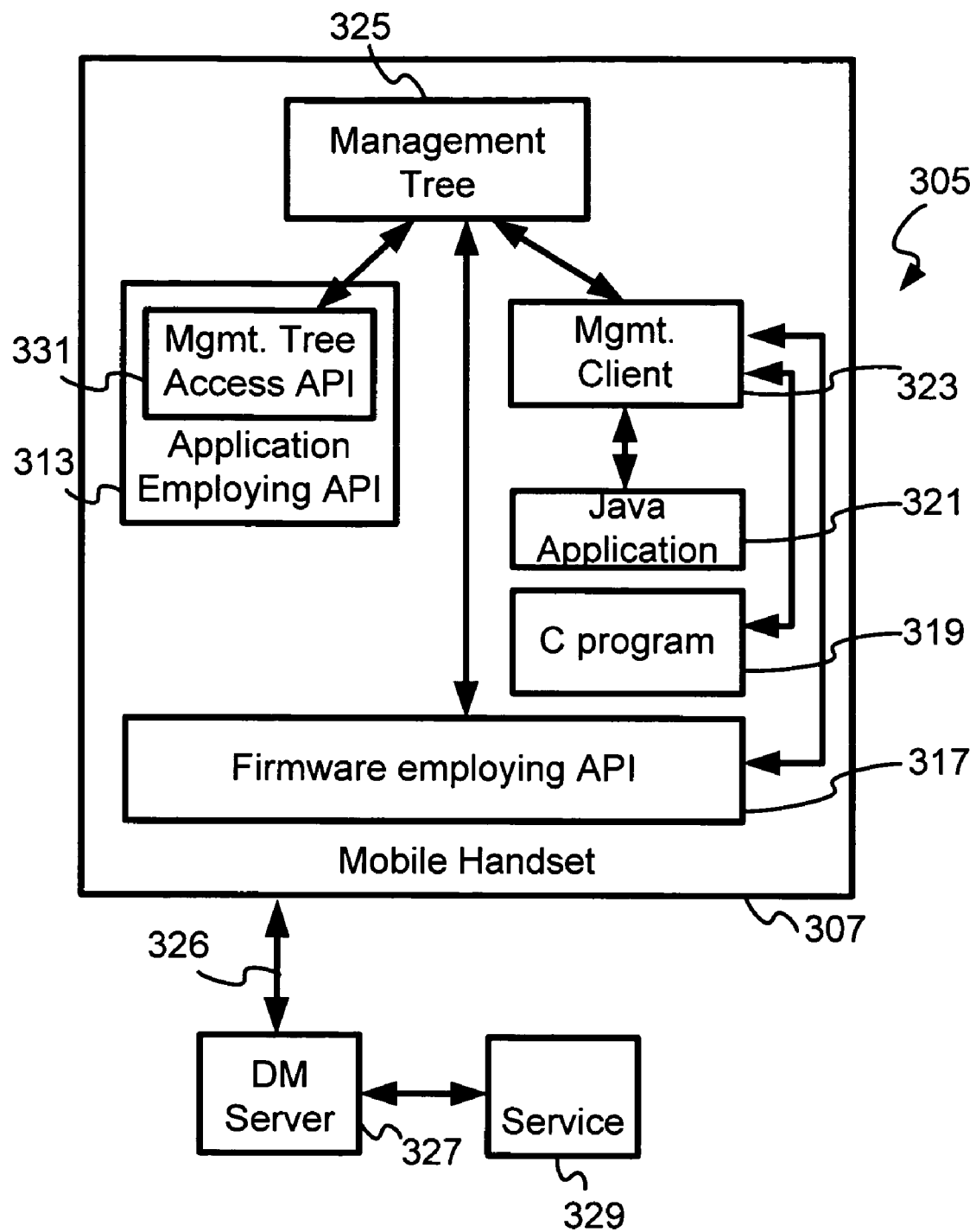
FIG. 3 is a perspective block diagram of an exemplary mobile handset network that facilitates the creation and manipulation of a management tree of managed objects in a mobile handset, in accordance with a representative embodiment of the present invention.

FIG. 3 is a perspective block diagram of an exemplary mobile handset network 305 that facilitates the creation and manipulation of a management tree 325 of managed objects in a mobile handset 307, in accordance with a representative embodiment of the present invention. As shown in the illustration of FIG. 3, the mobile handset network 305 may comprise a device management (DM) server 327 that is communicatively coupled to a service provider 329 and to the mobile handset 307 via a communication link 326. The communication link 326 may be a wired or wireless link, and may correspond, for example, to the communication links 126, 226 of FIGS. 1 and 2, respectively. The mobile handset 307 may be capable of supporting multiple execution environments, such as JVM and non-JVM environments, and may also be capable of providing simultaneous access to the management tree 325 from the multiple environments. The mobile handset 307 may comprise a firmware 317 that employs the management tree access API 331 to access managed objects in the management tree 325, a plurality of C programs 319 based on the C and C++ programming languages, such as those in the operating system (OS) and other typical applications, a management client 323, a java application 321 that executes in a JVM environment, and an application employing management tree access API 313.

In a representative embodiment of the present invention, managed objects may be saved in the management tree 325 from the Java program 321 executing in a JVM, and may be subsequently accessed by the C program 319 executing in another non-JVM environment, such as in an operating system. Such subsequent access may be supported via the management client 323 as well as via an application compiled with the management tree access API 331.

In a representative embodiment in accordance with the present invention, the management tree access API 331 may comprise the following objects and methods:

a) ManagementTree Class create method: to create a new tree resetTree method: to clear tree or reinitialize tree deleteSubTree method: to delete subtrees from tree indSubTree method: locate node or nodes or subtree after searching indNode method: search for specific node or nodes createManagedObject method: create a new managed object deleteManagedObject method: to delete a managed object and associated software. Note: a soft delete and a hard delete may be possible.

transform method: transform tree from one format to another b) ManagementTreeProxy Class: To Provide Access to Management Tree from Other Environments retrieveTree method: retrieve access to a tree execute method: execute a command on a managed object or on tree set method: set values for a managed object retrieve method: retrieve references to specific managed objects or values for specific managed objects c) FirmwareMO Class for Firmware Managed Object which may have information on where the firmware starts, on how many flash chips it occupies, on an optional memory map info for firmware, on security requirements for accessing firmware, etc.

In a representative embodiment of the present invention, the management tree 325 may have a managed object representing firmware in the mobile handset that an update agent may have access to. The update agent may be capable of retrieving information from the firmware managed object such as, for example, the location of firmware, its initialization flags, configuration parameters, if any, etc. In a related representative embodiment, the update package may be stored as a managed object that the update agent has access to, and may be capable of retrieving, at run-time.

Figure 4:
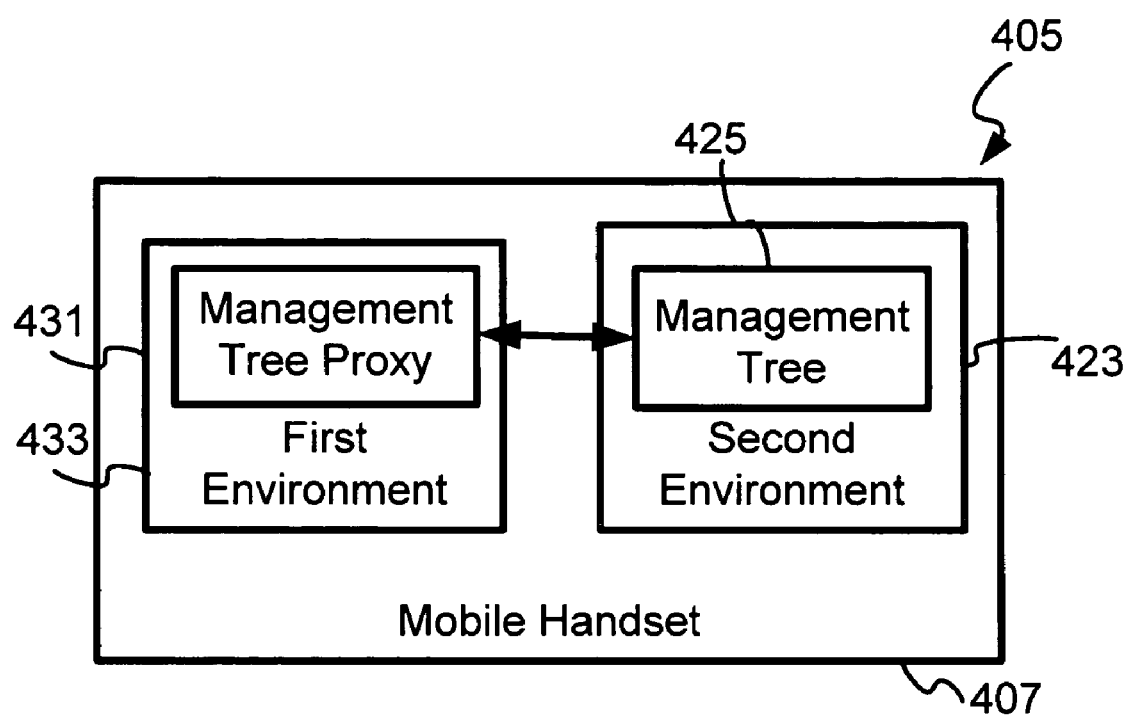
FIG. 4 is a perspective block diagram of an exemplary mobile handset that supports access to a management tree from a first environment, via a management tree proxy, while the management tree is maintained by a second environment, in accordance with a representative embodiment of the present invention.

FIG. 4 is a perspective block diagram of an exemplary mobile handset 407 that supports access to a management tree 425 from a first environment 433, via a management tree proxy 431, while the management tree 425 is maintained by a second environment 423, in accordance with a representative embodiment of the present invention. In a representative embodiment of the present invention, the management tree 425 may be maintained in the second environment (such as a DM client running over a Symbian OS by Symbian, Ltd.) while a consumer of the management tree 425 is in a first environment (such as a Java program running in a JVM or KVM (K virtual machine)). The consumer in the first environment 433 may access the management tree 425 via a management tree proxy 431 in the first environment 433. The management tree proxy 431 may expose the services/information provided by the management tree 425.

In various representative embodiments in accordance with the present invention, a mobile handset network may employ a device management server to manage managed objects that are located in a management tree such as, for example, the management tree 425. Access to the managed objects in the management tree may be provided to applications and components that execute in the same environment or in different environments. An application executing in one environment, such as Java, may access a management tree executing in another environment, such as a C-based OS environment, employing a proxy such as, for example, management tree proxy 431.

Figure 5:
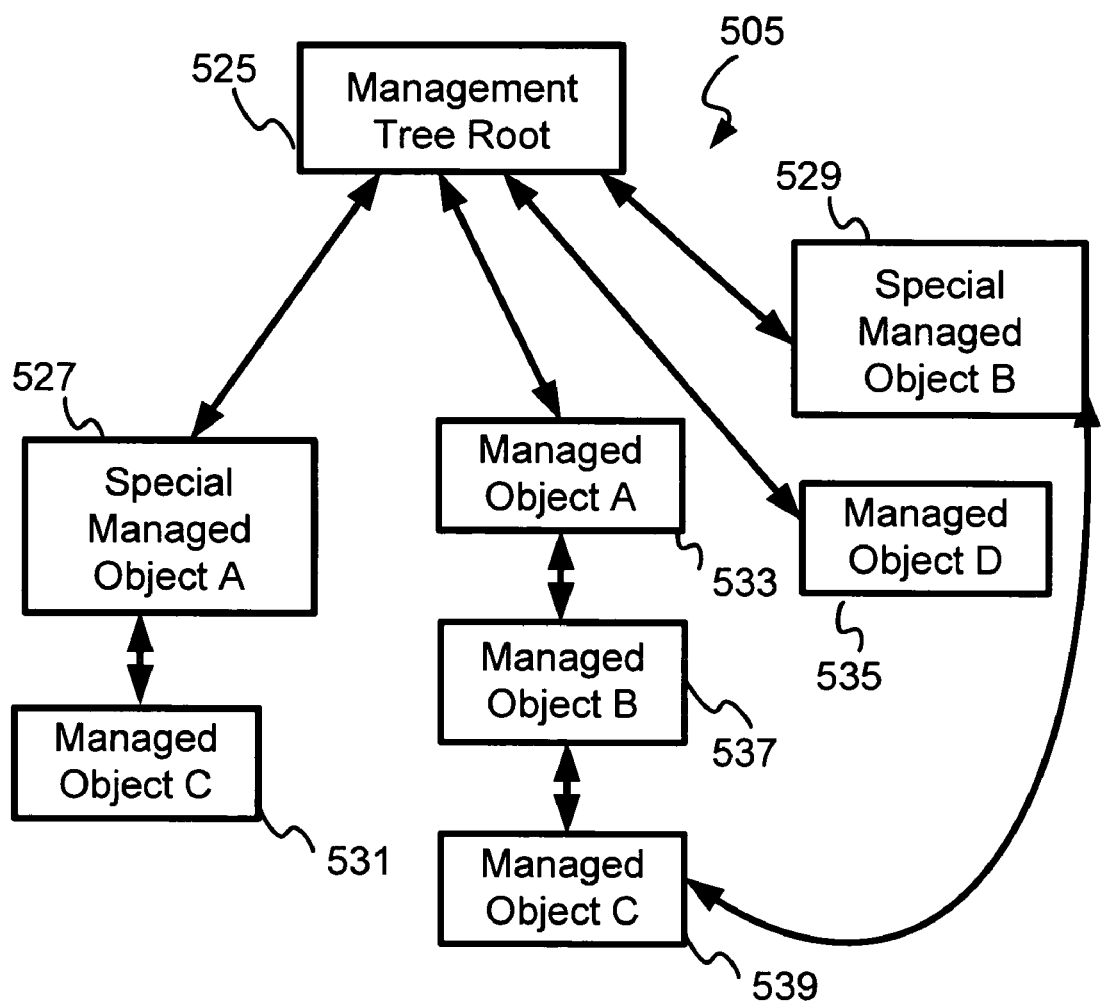
FIG. 5 is a perspective block diagram of an exemplary mobile handset that facilitates the creation and manipulation of managed objects in a management tree, in accordance with a representative embodiment of the present invention.

FIG. 5 is a perspective block diagram of an exemplary mobile handset 505 that facilitates the creation and manipulation of managed objects in a management tree, in accordance with a representative embodiment of the present invention. As illustrated in FIG. 5, the management tree root may serve as a gateway or navigation point to a plurality of managed objects in the management tree 525, and some of the managed objects may be special managed objects whose physical location in non-volatile memory is assigned to fixed or well known memory address locations. In a representative embodiment of the present invention, the management tree 525 may provide access to all the managed objects in the management tree 525 based on associated security mechanisms or access control lists.

In various representative embodiments in accordance with the present invention, the management tree 525 may comprise both special managed objects, such as a special managed object A 527 and a special managed object B 529, as well as regular managed objects, such as managed object A 533, a managed object B 537, and a managed object C 539. A special managed object such as, for example, special managed object A 527 and special managed object B 529, may have regular managed objects in its subtree or as a subnode. In addition, a managed object such as, for example, managed object A 533, managed object B 537, and managed object C 539, may refer to other managed objects or to other special managed objects. In addition, managed objects may refer to other managed objects or special managed objects that are in other subtrees. In a representative embodiment of the present invention, special managed objects may have the same behavioral semantic as regular managed objects, while their implementation details such as, for example, physical mapping onto storage devices, may be different. For example, in a representative embodiment of the present invention, a special managed object such as the special managed object A 527 may have a mapping onto a physical non-volatile memory such that its address location is always the same and is at a well-known location, in order that applications may access its components or values based on its well-known address.

Figure 6:
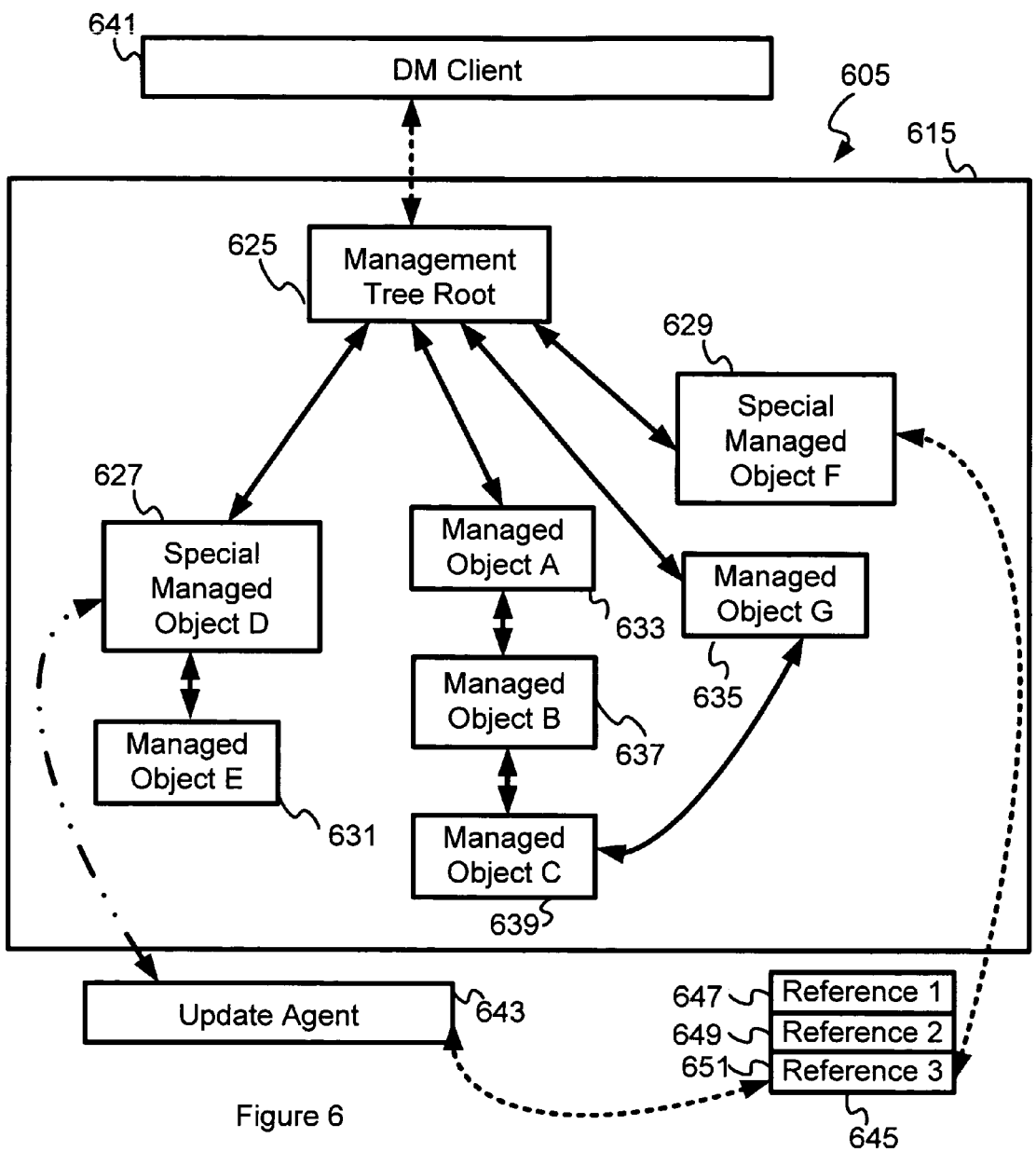
FIG. 6 is a perspective block diagram of an exemplary mobile handset comprising a management tree that stores regular managed objects and special managed objects, in accordance with a representative embodiment of the present invention.

FIG. 6 is a perspective block diagram of an exemplary mobile handset 605 comprising a management tree 615 that stores regular managed objects and special managed objects, in accordance with a representative embodiment of the present invention. As shown in the illustration of FIG. 6, the mobile handset 605 may also comprise a DM client 641 that manages the management tree 615 and is capable of providing access to the management tree 615, and an update agent 643 that is capable of accessing special managed objects in the management tree 615. The special managed objects such as, for example, special managed object D 627 and special managed object F 629 in the management tree 615, may be accessible to the consumers via the DM client 641, and to specific applications or components such as, for example, the update agent 643 that may execute as part of the firmware of the mobile handset 605.

In a representative embodiment of the present invention, references to the address locations of the special managed objects in the management tree 615 may be saved by the DM client 641 in a special managed object reference table 645 that is also accessible to the update agent 643. The update agent 643 may access the information stored in the special managed objects such as, for example, the special managed object F 629, and may employ an address (or reference) stored in a known index (the index of 3, for example) in the special managed object reference table 645. The address of the special managed object reference table 645 may be a well-known address to the update agent 643. In a related representative embodiment of the present invention, the address location of the special managed object reference table 645 may be known to the update agent 643 by a default value that is hard-coded or predefined for the update agent 643. Thus, the update agent 643 may access data, code or parameter values stored in the special managed object F 629 using the default or well-known address of the special managed object reference table 645 and the index of the special managed object that it needs to access, such as the special managed object F 629.

In a related representative embodiment in accordance with the present invention, the update agent 643 may employ a pre-defined address (an address that is well-known or hard-coded) for the special managed object D 627, in order to access the contents of the special managed object D 627.

In a representative embodiment of the present invention, the DM client 641 (or alternatively, a download agent) may download an update package from a DM server such as, for example, the DM server 127 of FIG. 1, and the downloaded update package and its metadata may be stored in the special managed object F 629. In such a representative embodiment, the DM client 641 (or a download agent) may also save the address of the special managed object F 629 in, for example, the index 3 of the special managed object reference table 645. Subsequently (for example, after a reboot), the update agent 643 may access the special managed object reference table 645 using its well known address location, may access the address of the special managed object F 629 stored at index 3, and may retrieve the update package and its metadata. The update agent 643 may then update the firmware and/or software in the mobile handset 605, employing the update package. Subsequently, the update agent 643 may access special managed object D 627 from the special managed object reference table 645 at an index of 2, to set status information related to the update so that it may be accessed as a managed object by the DM client 641 or other applications or components.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A mobile device managed by a device management server, the mobile device comprising:

a device management tree comprising a plurality of nodes and leaves from several different environments, wherein the plurality of nodes and leaves represent at least a firmware component and at least a software component including a provisioning parameter and a configuration parameter, and wherein the device management tree is capable of being manipulated by the device management server;

wherein at least one of the firmware component and the software component is resident in the mobile device;

a first mechanism providing access to the device management tree operable via a management client to provide read and/or write synchronization of the plurality of nodes and leaves; and a second mechanism providing access to the device management tree operable via an agent to provide access to the plurality of nodes and leaves during a compilation of the agent with an associated application interface or component interface of the management tree;

wherein the device management tree being locally accessible by at least a subset of the at least one of a firmware component and a software component resident in the mobile device via each of the first and second mechanisms providing access to the device management tree; and wherein at least one of the plurality of nodes and leaves comprises a special node that is located at a predetermined location in memory that is known and accessible by the at least a subset of the at least one of a firmware component and a software component resident in the mobile device.

2. The mobile device according to claim 1 wherein the at least a subset of the at least one of a firmware component and a software component resident in the mobile device is capable of setting values into at least one of the plurality of nodes and leaves.

3. The mobile device according to claim 2 wherein the at least a subset of the at least one of a firmware component and a software component resident in the mobile device is capable of setting a status value into at least one of the plurality of nodes and leaves.

4. The mobile device according to claim 1 wherein the at least a subset of the at least one of a firmware component and a software component resident in the mobile device is capable of reading values from the at least one of the plurality of nodes and leaves.

5. The mobile device according to claim 1 wherein:

the predetermined location in memory is provisioned into the mobile device;

the at least one of a firmware component and a software component resident in the mobile device employs the special node at the predetermined location in memory in order to access the at least one of the plurality of nodes and leaves; and the at least one of a firmware component and a software component resident in the mobile device employs the special node at the predetermined location in memory to set status values in the at least one of the plurality of nodes and leaves.

6. The mobile device according to claim 1 wherein the special node located in the predetermined location in memory is accessible only to a qualified subset of the at least one of a firmware component and a software component resident in the mobile.

7. The mobile device according to claim 1 further comprising:
a plurality of special nodes located in a plurality of associated predetermined locations, each of the plurality of associated predetermined locations is known to those of the at least one of a firmware component and a software component resident in the mobile device that have a need to access the information stored in the plurality of special nodes.

8. The mobile device according to claim 1 wherein the plurality of special nodes are located together in a structure at a special location.

9. A mobile device that facilitates the creation and manipulation of a plurality of managed objects in a management tree based upon information received via a communication network, the mobile device comprising:
non-volatile memory including the plurality of management objects from several different environments representing at least firmware and software components including provisioning parameters and configuration parameters, the management tree having a root serving as a gateway or navigation point to the plurality of managed objects in the management tree;
a firmware component comprising update agent code for converting at least a portion of the non-volatile memory from a first version of code to a second version of code;
one or both of an operating system and/or an application;
a management client providing the one or both of an operating system and/or an application with access to at least a subset of the managed objects to provide read and/or write synchronization of the management objects;
an agent providing the one or both of an operating system and/or an application with access to at least a subset of the managed objects during a compilation of the agent with an associated application interface or component interface of the management tree; and
at least a subset of the managed objects being special managed objects each of whose physical location in the non-volatile memory is assigned to a predetermined memory address, wherein the special managed objects are accessed and executed from the predetermined memory address in the non-volatile memory by each of the firmware component and the management client.

10. The mobile device of claim 9 wherein the firmware component comprises code executed during at least one of reboot and startup of the mobile device.

11. The mobile device of claim 9 wherein the special managed objects have the same behavioral semantics as others of the plurality of managed objects that are not special.

12. The mobile device of claim 11 wherein each of the special managed objects is mapped to a physical non-volatile memory address that is an associated fixed and well-known address.

13. The mobile device of claim 12 wherein the at least one firmware component comprises at least one sub-component that is accessible using the associated fixed and well-known address of at least one of the special managed objects.

14. The mobile device of claim 12 wherein the special managed objects are capable of providing configuration data to associated ones of the at least one firmware component, the configuration data comprising at least one of an address, status information, and security information.

15. The mobile device of claim 14 wherein the configuration data comprises a 4-byte address where an update package is saved in the non-volatile memory, a 4-byte status information capable of indicating the availability of the update package, a 4-byte verification data, and a 4-byte address of a backup memory area for use in fault tolerant updates.

16. The mobile device of claim 14 wherein:
the at least one firmware component comprises update agent code for updating the non-volatile memory;
the update agent code is capable of accessing special managed objects comprising configuration data, when executed during at least one of startup and reboot of the mobile device; and
the update agent code is capable of accessing special managed objects at the associated fixed and well-known address.

17. The mobile device of claim 9 further comprising:
update agent code capable of converting at least a portion of the non-volatile memory from a first version of code to a second version of code;
a special managed object reference table used to save references to addresses of special managed objects in the management tree, the special managed object reference table accessible to the update agent code; and
the update agent code capable of accessing information stored in special managed objects employing references in the special managed object reference table.

18. The mobile device of claim 17 wherein an address of the special managed object reference table is a well-known address known to the update agent code.

19. The mobile device of claim 17 wherein an address of the special managed object reference table is known to the update agent code by a default value that is hard-coded or predefined for the update agent code.

* * * * *